J. O. NEIKIRK.
CENTER AND SIDE DUMP CAR.
APPLICATION FILED JUNE 4, 1917.
1,299,212.
Patented Apr. 1, 1919.
3 SHEETS—SHEET 1.
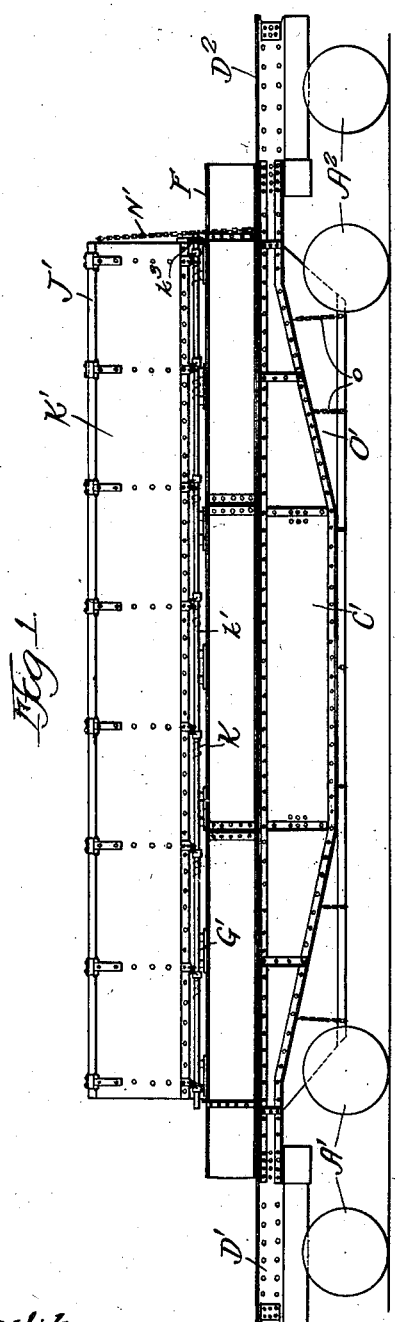
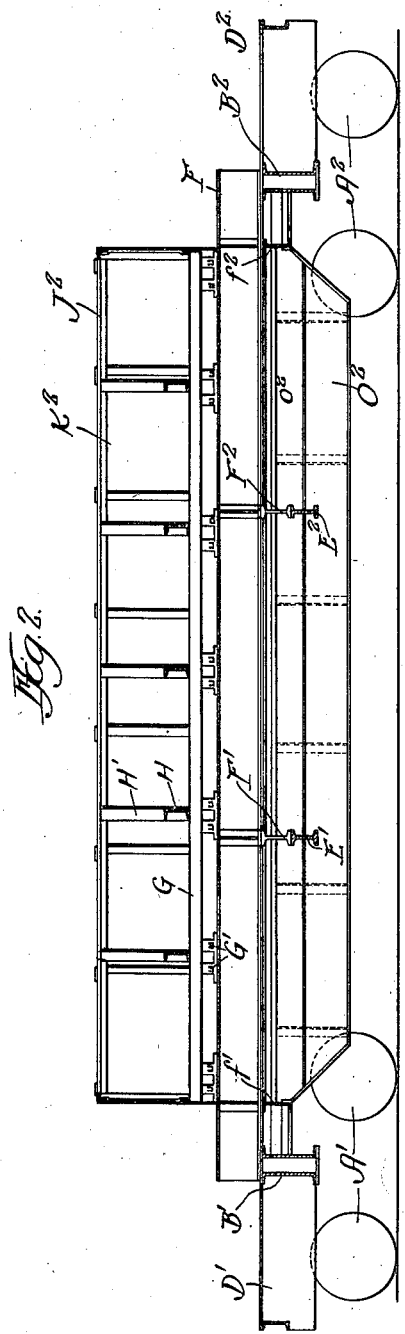

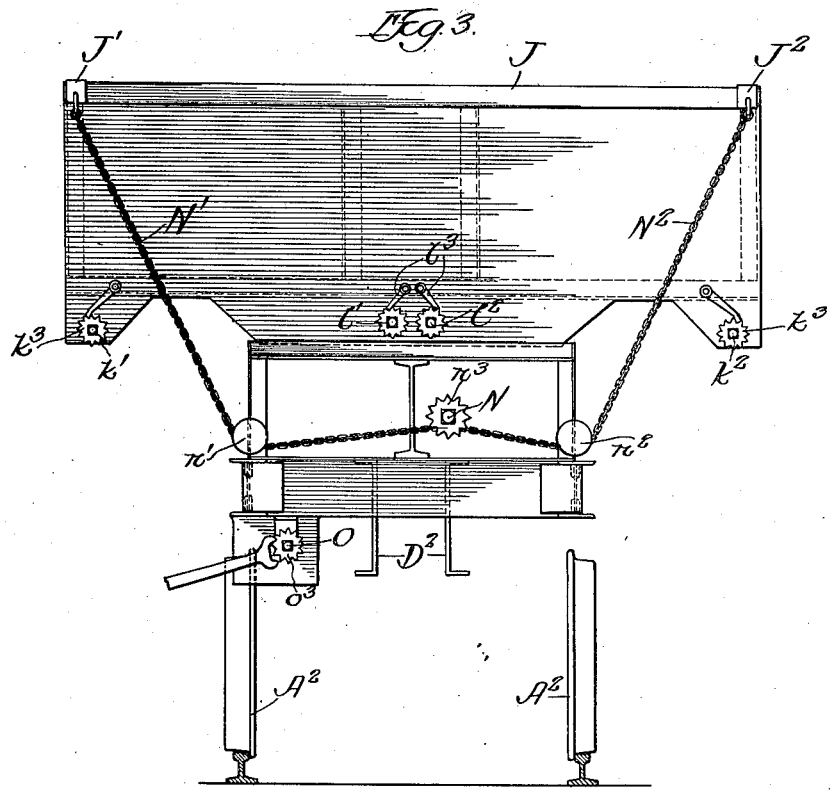
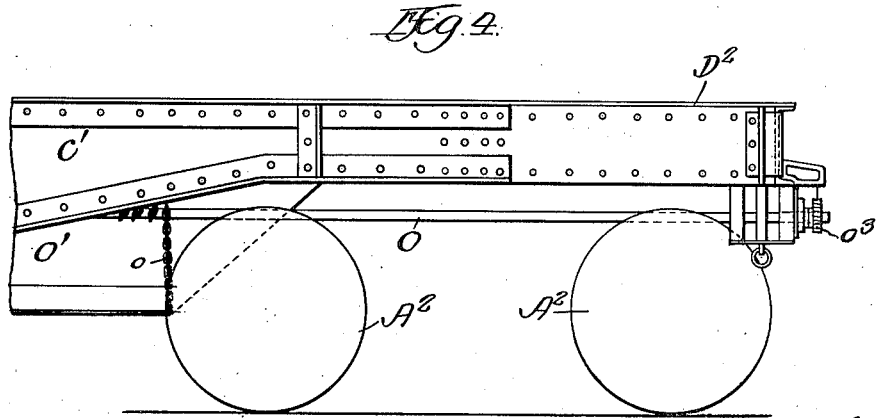

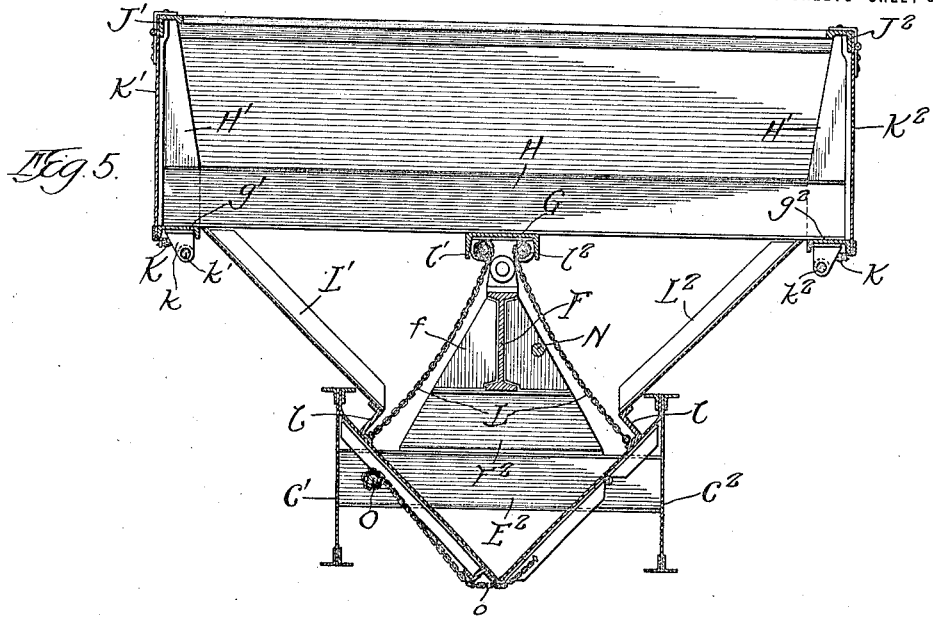
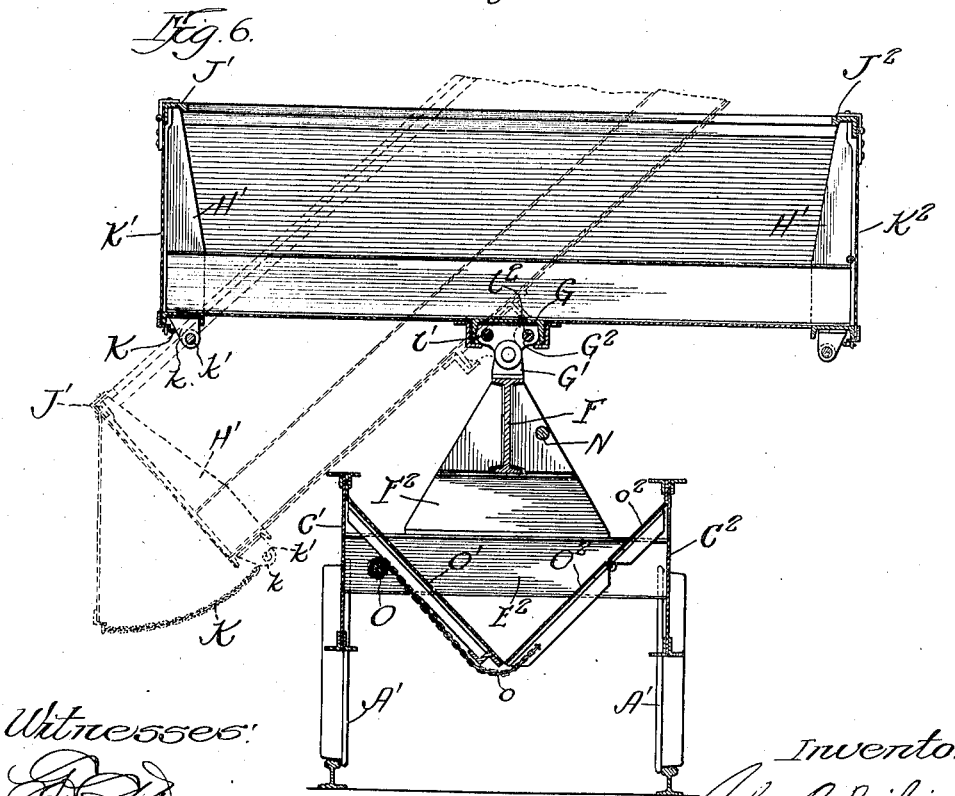

UNITED STATES PATENT OFFICE.

JOHN O. NEIKIRK, OF LOMBARD, ILLINOIS, ASSIGNOR TO RODGER BALLAST CAR COMPANY, A CORPORATION OF MAINE.

CENTER AND SIDE DUMP CAR.

1,299,212.

Specification of Letters Patent.

Patented Apr. 1, 1919.

Application filed June 4, 1917. Serial No. 172,637.

*To all whom it may concern:*

Be it known that I, JOHN O. NEIKIRK, a citizen of the United States, and resident of Lombard, in the county of Dupage and State of Illinois, have invented certain new and useful Improvements in Center and Side Dump-Cars, of which the following is a specification.

My invention relates in general to freight cars, and more particularly to an improved dump car for discharging the entire load to either side of the track or to the center thereof.

In the use of dump cars it is sometimes desirable to discharge the entire load to one or the other side of the track. There are also occasions when it is desirable to discharge the load centrally of the track. The most effective means for discharging the entire load to one or the other side of the track is to mount the car body to tilt about a central longitudinal axis, while the most effective means for dumping the load to the center of the track is to provide a hopper at the longitudinal center of the car.

The primary object of my invention is to provide a dump car which will equally conveniently and effectively discharge its entire load by gravity to either side, or to the center of the track.

A further object of my invention is to provide a dump car of the tilting body type in which the load may also be discharged centrally of the track.

A further object of my invention is to provide a dump car of the center hopper type in which the entire load may also be discharged by gravity to either side of the track.

A still further object of my invention is to provide a dump car from which the entire load may be discharged by gravity to either one side, or the other side, or to the center, of the track, as occasion may require, and which will be comparatively simple in construction, convenient in operation, and effective in use.

My invention will be more fully disclosed hereinafter with reference to the accompanying drawings in which the same is illustrated as embodied in a convenient and practical form and in which, Figure 1 is a side elevation;

Fig. 2 a vertical central section;

Fig. 3 an enlarged end elevation;

Fig. 4 a side elevation of one end of the car;

Fig. 5 a central cross section, the bottom doors being shown dropped; and

Fig. 6 a central cross section showing the bottom doors closed and the body indicated in dotted lines in a tilted position.

Similar reference characters are used to designate similar parts in the several figures of the drawings.

Reference characters $A'$, $A^2$ indicate the wheels of the trucks of the car, and $B'$, $B^2$ the body bolsters of the car. $C'$, $C^2$ designate the side sills, and $D'$, $D^2$ the draft sills.

Reference characters $E'$, $E^2$ designate transverse beams connected at their ends to the side sills $C'$, $C^2$, and preferably spaced substantially the same distance from each other and from the body bolsters.

$F'$, $F^2$ indicate beams, preferably of I-section, which are mounted upon the cross beams $E'$, $E^2$ intermediate of their ends, as clearly shown in Figs. 5 and 6. F designates a central longitudinal beam supported at its ends upon the body bolsters $B'$, $B^2$ and intermediate of its ends upon the filler beams $F'$, $F^2$, as well as upon transverse beams $f'$, $f^2$ located adjacent the respective body bolsters. Mounted upon the top of the center beam F are spaced brackets $G'$ which form the lower members of hinges, the upper members being designated $G^2$. The members $G^2$ are secured to the under surface of a longitudinal central floor beam G of the car body. Secured upon the beam G are spaced transverse beams H to the opposite ends of which are connected stakes $H'$. $J'$, $J^2$ designate side bars secured to the upper ends of the stakes $H'$ and forming the top side members of the car body. The sides of the car body are in the form of outwardly swinging doors $K'$, $K^2$ which are hinged along their upper edges to the bars $J'$, $J^2$, respectively. The lower edges of the side doors $K'$, $K^2$ are connected by chains K with rotary shafts $k'$, $k^2$, journaled beneath the side frame members $g'$, $g^2$ of the car body. The frame members $g'$, $g^2$ are rigidly secured beneath the ends of the transverse beams H of the car body. The shafts $k'$, $k^2$ project beyond the end wheels of the car body and there provided with suitable pawl and ratchet mechanism $k^3$ for retaining them in any positions to which they may be rotated.

L′, L² designate drop floor doors which are hinged at their outer edges to the floor side members g′, g² and are connected at their inner edges by chains L with rotary shafts l′, l² journaled in bearings beneath the center beam G of the car floor. The said shafts may conveniently be journaled in the upper members G² of the hinges which tiltably support the car body. The shafts l′, l² project at their ends slightly beyond the end walls of the car body and are there provided with suitable pawl and ratchet mechanism l³ for retaining them in any positions to which they may be rotated. Beneath the inner edges of the drop doors L′, L² are Z bars l to the lower flanges of which are connected the chains L. The said Z beams extend around and beneath the sides of the center floor beam G of the car body when the doors are closed, as shown in Fig. 6, thereby permitting the doors to lie in a horizontal plane flush with the upper surface of the center floor beam G.

Rigidly supported between the side sills C′, C² of the car underframe is a hopper preferably comprising one immovable side O′ and a converging side formed in part of a door O² and in part of a rigid section o² alined with the rigid section O². The door section O² is hinged at its upper edge to the lower edge of the rigid section o², and its lower edge is connected by chains o with a rotary shaft O suitably journaled in the car underframe as by means of bearings extending through the transverse beams E². The ends of the shaft O project slightly beyond the end sills of the car and are there provided with suitable mechanism o³ for rotating the shaft and for holding it in any position to which it may be rotated. Suitable mechanism is provided for tilting the car body to either side, or for retaining the same in a horizontal position, such mechanism being shown as consisting of chains N′, N² at the ends of the car body and connecting the ends of the top members J′, J² of the car sides with a rotary shaft N. The shaft N is suitably journaled as by means of bearings formed in the gusset plates f which are interposed between the opposite sides of the central beam F and the transverse beams F′, F². The shaft N is provided with suitable means $n^3$ for rotating the same and retaining it in any position to which it may be rotated. Suitable guides n′, n² are provided around which the chains N′, N² extend.

The operation of my improved car is as follows:

When it is desired to discharge a load to one or the other side of the track the corresponding shaft k′ k² is released and the shaft N rotated in a direction to wind thereon the chain N′ or N². The body is thereby tilted to the desired side of the track, as indicated in Fig. 6 in dotted lines, and the load is discharged through the outwardly swinging of the car side. After the load has been discharged the shaft N is rotated in a direction to return the car body to a horizontal position through the winding on the shaft N of the appropriate chain N′ or N².

When it is desired to discharge the load to the center of the track the drop doors L′, L² are allowed to swing downwardly at their inner edges by releasing the shafts l′ l². The load thereby passes into the center hopper from which it is discharged through the door O² upon releasing the shaft O. After the load has been discharged the shafts l′ l² are rotated in a direction to wind thereon the chains f thereby lifting the doors L′, L² into closed position. The hopper door O² is also closed by winding the chains o on the shaft O.

From the foregoing description it will be observed that I have invented an improved dump car by means of which the load may be discharged by gravity to either side, or to the center, of the track. It will be further observed that although the bottom doors of the car body are horizontal when closed, the entire load may be discharged to either side of the track as may be desired. It will also be evident that the position of the car body relatively to the center rigid hopper is such that the entire load may be discharged by gravity to the center of the track.

I claim:

1. A dump car, comprising a tilting body for discharging the load to either side of the track, and means for discharging the load centrally of the track, substantially as described.

2. A flat bottom dump car, comprising pivotally mounted floor means for discharging its entire load by gravity to the center or to either side of the track, substantially as described.

3. A dump car, comprising a tilting body for discharging the load to either side of the track, and means supported below and independently of the body for directing the discharge of the load to the center of the track, substantially as described.

4. In a dump car, the combination with a body, comprising sides hinged to swing outwardly, and a bottom formed of sections hinged to drop away from the longitudinal center of the body, and means for tilting said body about a longitudinal axis, substantially as described.

5. In a dump car, the combination with a body, comprising sides hinged to swing outwardly, and a bottom formed of sections hinged to drop away from the longitudinal center of the body, means for tilting said body about a longitudinal axis, and a hopper supported centrally below and independently of the car body, substantially as described.

6. In a dump car, the combination with a body, of means for tilting said body about a longitudinal axis to discharge the load to either side, a hopper below said body, and means for discharging the load from said body into said hopper, substantially as described.

7. In a dump car, the combination with a body, comprising sides hinged to swing outwardly, and a bottom formed of sections hinged to drop away from the longitudinal center of the body, means for tilting said body about a longitudinal axis, and stationary means supported below said body for directing to the center of the track the load discharged through the bottom of the body, substantially as described.

8. In a dump car, the combination with longitudinal members of a hopper supported between said longitudinal members, a center support above said longitudinal members, a body pivotally mounted upon said center support, means for tilting said body to either side, and means for discharging the load from said body into said hopper, substantially as described.

9. In a dump car, the combination of side sills, of a hopper supported by said side sills, a center sill, a body pivotally mounted upon said center sill, the bottom of said body being formed of sections hinged at the car sides, means for raising said sections into closed position and for permitting them to swing downwardly away from the center of the body to form extensions of the sides of the said hopper, and means for tilting the said body to either side, substantially as described.

Signed at Chicago, State of Illinois, this 29th day of May, 1917.

JOHN O. NEIKIRK.

Witnesses:
MILTON T. MILLER,
AMANDA F. WADE.